(12) United States Patent
Eisen et al.

(10) Patent No.: US 10,048,963 B2
(45) Date of Patent: Aug. 14, 2018

(54) EXECUTING SYSTEM CALL VECTORED INSTRUCTIONS IN A MULTI-SLICE PROCESSOR

(71) Applicant: International Business Machines Corporation, Armonk, NY (US)

(72) Inventors: Susan E. Eisen, Round Rock, TX (US); Nicholas R. Orzol, Austin, TX (US); Mehul Patel, Austin, TX (US); Eula A. Tolentino, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 15/161,461

(22) Filed: May 23, 2016

(65) Prior Publication Data

US 2017/0337058 A1 Nov. 23, 2017

(51) Int. Cl.
*G06F 9/30* (2018.01)
*G06F 13/40* (2006.01)
*G06F 13/42* (2006.01)

(52) U.S. Cl.
CPC ........ *G06F 9/30036* (2013.01); *G06F 9/3016* (2013.01); *G06F 9/30058* (2013.01); *G06F 13/4068* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 6,560,613 B1* | 5/2003 | Gylfason | G06F 17/30067 |
| 6,983,359 B2* | 1/2006 | Miller | G06F 9/3802 |
| | | | 712/207 |
| 8,131,976 B2 | 3/2012 | Doing et al. | |
| 8,250,349 B2* | 8/2012 | Inoue | G06F 9/30058 |
| | | | 712/242 |
| 2004/0243900 A1* | 12/2004 | Henkel | G06F 13/1605 |
| | | | 714/742 |
| 2006/0026410 A1* | 2/2006 | Yokoi | G06F 9/3806 |
| | | | 712/240 |
| 2010/0262813 A1 | 10/2010 | Brown et al. | |
| 2011/0040956 A1* | 2/2011 | Kissell | G06F 9/3851 |
| | | | 712/244 |
| 2015/0378915 A1 | 12/2015 | Gschwind | |

* cited by examiner

*Primary Examiner* — Eric Coleman
(74) *Attorney, Agent, or Firm* — Joseph D. Downing; Robert R. Williams; Kennedy Lenart Spraggins LLP (57) ABSTRACT

Executing system call vectored (SCV) instructions in a multi-slice processor including receiving, by an instruction fetch unit, a SCV instruction, wherein the SCV instruction is a system call from an operating system; sending the SCV instruction to a branch issue queue; determining, by the branch issue queue, that the SCV instruction is next-to-complete; issuing the SCV instruction to a branch resolution unit; and executing the SCV instruction by the branch resolution unit.

17 Claims, 8 Drawing Sheets

EXECUTING SYSTEM CALL VECTORED INSTRUCTIONS IN A MULTI-SLICE PROCESSOR

BACKGROUND

Field of the Invention

The field of the invention is data processing, or, more specifically, methods, apparatus, and products for executing system call vectored instructions in a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for executing system call vectored instructions in a multi-slice processor are disclosed in this specification. Executing system call vectored (SCV) instructions includes receiving, by an instruction fetch unit, a SCV instruction, wherein the SCV instruction is a system call from an operating system; sending the SCV instruction to a branch issue queue; determining, by the branch issue queue, that the SCV instruction is next-to-complete; issuing the SCV instruction to a branch resolution unit; and executing the SCV instruction by the branch resolution unit.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
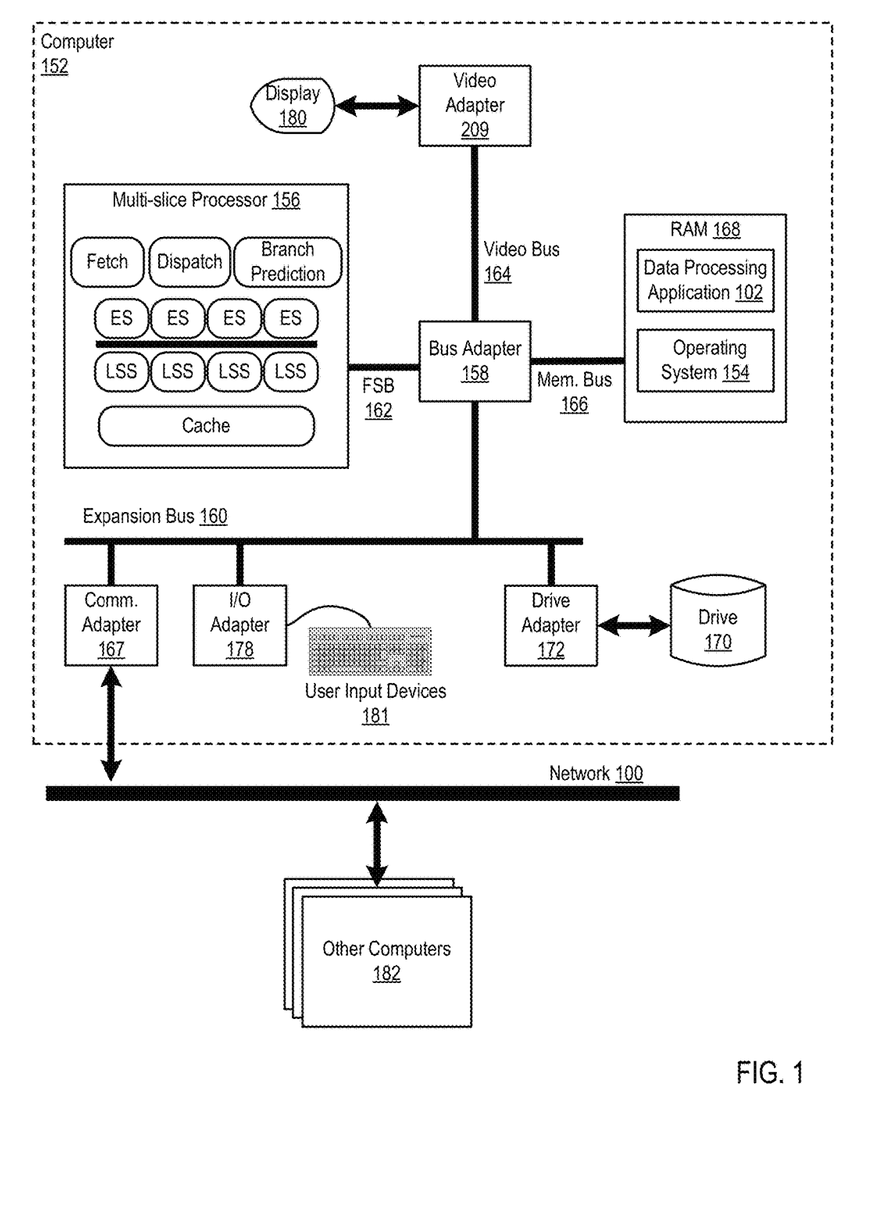
FIG. 1 sets forth a block diagram of an example system configured for executing system call vectored (SCV) instructions in a multi-slice processor according to embodiments of the present invention.

Exemplary methods and apparatus for executing system call vectored (SCV) instructions in a multi-slice processor in accordance with the present invention are described with reference to the accompanying drawings, beginning with FIG. 1. FIG. 1 sets forth a block diagram of an example system configured for executing SCV instructions in a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
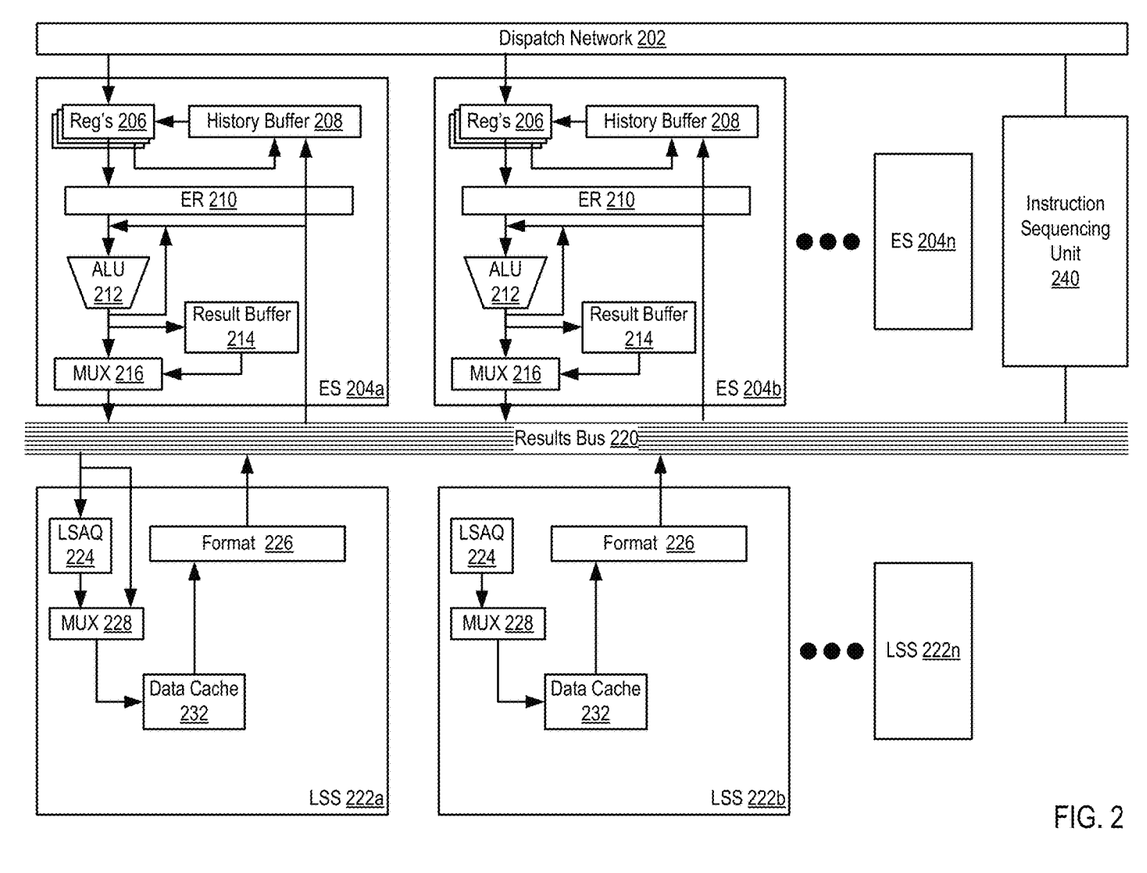
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load or store instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted as a single unit, each of the plurality of execution slices may include a respective instruction sequencing unit similar to instruction sequencing unit (240). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions as determined by an ITAG. Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
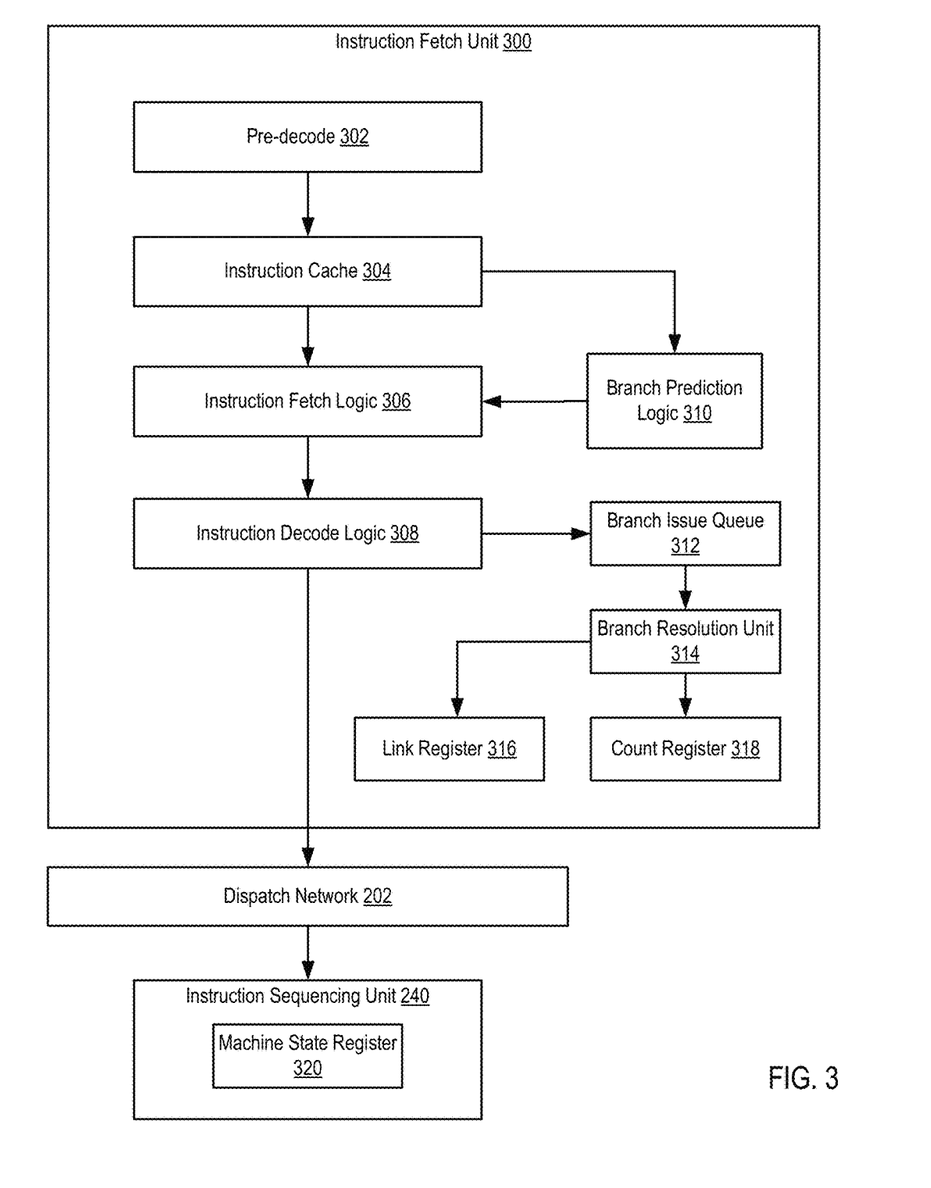
FIG. 3 sets forth a block diagram of a portion of a multi-slice processor according to embodiments of the present invention.

For further explanation, FIG. 3 sets forth a block diagram of another portion of a multi-slice processor according to embodiments of the present invention. The example multi-slice processor of FIG. 3 includes an instruction fetch unit (300) that includes a pre-decode logic (302) configured to retrieve instructions from memory, perform a preliminary decode of the instruction and store the pre-decoded instruction into an instruction cache (304).

The instruction fetch unit (300) also includes branch prediction logic (310). Branch prediction logic generally performs branch prediction for pre-decoded instructions and tracks various branch prediction statistics for executing and executed instructions. The branch prediction logic (310) may include or access various registers and storage that contain such branch prediction statistics. Examples of storage entities may include global branch history tables and the like.

The instruction fetch unit (300) also includes an instruction fetch logic (306). The instruction fetch logic (306) generally retrieves instructions from the instruction cache and provides the fetched instruction to instruction decode logic (308).

The instruction fetch unit (300) also includes a branch issue queue (312). The branch issue queue (312) stores dispatched instructions (typically branch instructions) for the branch resolution unit (314). The branch resolution unit (314) executes branch instruction and may be configured to execute SCV instructions and RFSCV instructions.

The branch resolution unit (314) is also configured to access the link register (316) and the count register (318). The link register (316) is a special purpose register configured to store a return address. Specifically, the link register (316) is configured to store the effective address of the next instruction to be executed by the computing system after handling a system call. The count register (318) is a special purpose register configured to store a machine state register value. Access to the link register (316) and the count register (318) may be limited to specific internal operations (such as move-to and move-from special purpose register operations) and the branch resolution unit (314).

The example instruction decode logic (308) of FIG. 3 performs a final decode operation on the fetched instructions and provides the decoded instructions to the dispatch network (202). The dispatch network as described above, dispatches the decoded instructions among slices.

Also operatively connected to the dispatch network (202) is the instruction sequencing unit (240). The instruction sequencing unit (240) includes a machine state register (320). The machine state register (320) is a special purpose register configured to store the operating mode of the computer.

Figure 4:
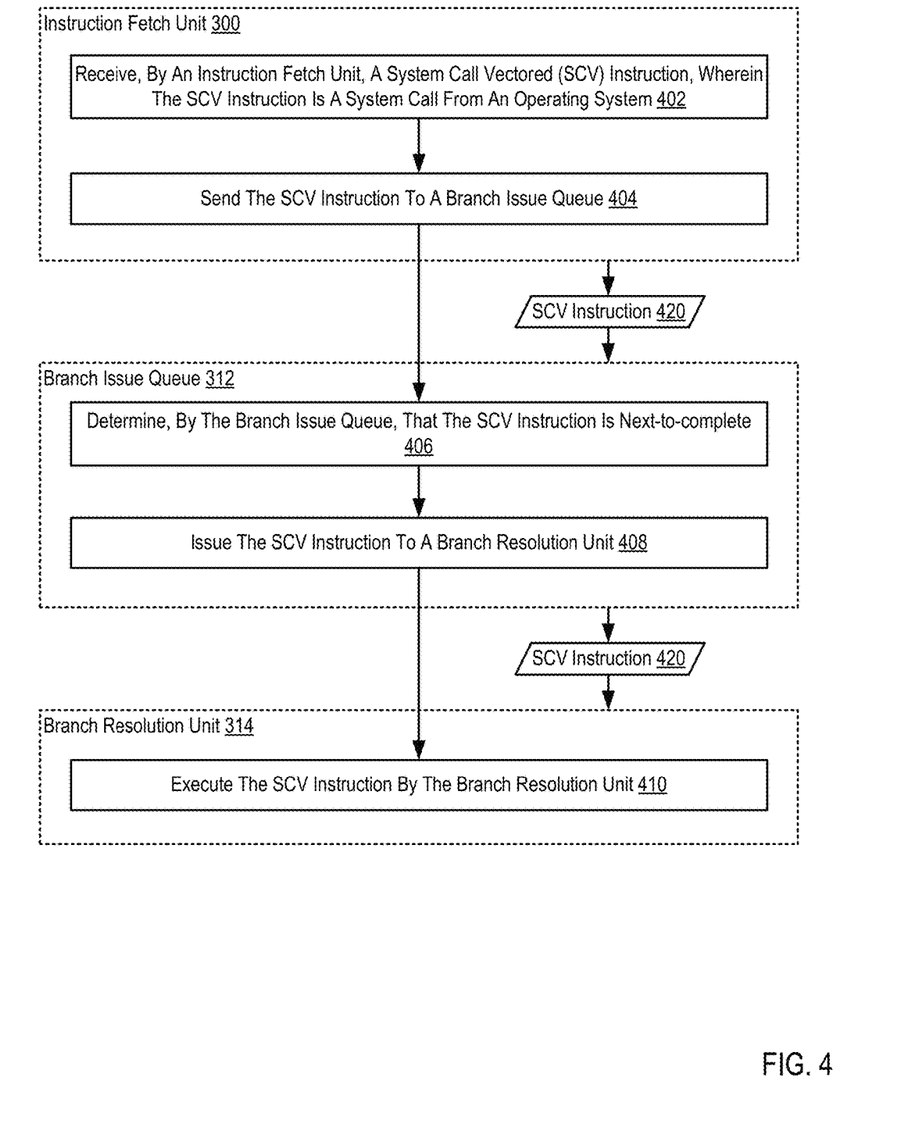
FIG. 4 sets forth a flow chart illustrating an exemplary method for executing SCV instructions in a multi-slice processor according to embodiments of the present invention.

For further explanation, FIG. 4 sets forth a flow chart illustrating an exemplary method executing system call vectored (SCV) instructions in a multi-slice processor. The method of FIG. 4 may be carried out by a multi-slice processor similar to that in the examples of FIGS. 1-3. The method of FIG. 4 includes receiving (402), by an instruction fetch unit (300), a system call vectored (SCV) instruction (420), wherein the SCV instruction (420) is a system call from an operating system. The SCV instruction is an instruction called by the operating system to save a current state of the computing system. SCV instructions may be used to switch between executing one set of program instructions (such as user code) and another set of instructions (such as operating system code). A return from system call vectored (RFSCV) instruction restores the saved state of the computing system, and may be used to revert back from executing one set of program instructions (such as operating system code) and begin executing another set of instructions (such as user code).

Receiving (402), by an instruction fetch unit (300), a SCV instruction (420), wherein the SCV instruction (420) is a system call from an operating system may be carried out by decoding the SCV instruction (420) by the instruction fetch unit (300) and setting (604), within the decoded SCV instruction (420), an element indicating that the SCV instruction (420) writes to a link register and a count register. The SCV instruction (420) may be invoked from user code attempting to temporarily switch from executing one set of instructions (such as user code) to executing another set of instructions (such as operating system code).

The method of FIG. 4 also includes sending (404) the SCV instruction (420) to a branch issue queue (312). Sending (404) the SCV instruction (420) to a branch issue queue (312) may be carried out by transmitting the SCV instruction (420) to the branch issue queue (312) as though the SCV instruction (420) were a branch instruction. For example, the instruction decode logic (380) may instrument the SCV instruction (420) such that the branch issue queue (312) processes the SCV instruction (420) in the same way as a branch instruction.

The method of FIG. 4 also includes determining (406), by the branch issue queue (312), that the SCV instruction (420) is next-to-complete. Determining (406), by the branch issue queue (312), that the SCV instruction (420) is next-to-complete may be carried out by receiving an indication (e.g., by a completion table) that the SCV instruction (420) is next instruction to be completed (e.g., by a thread in a processing core). The SCV instruction (420) may include an element that instructs the branch issue queue (312) to wait until the SCV instruction (420) is next-to-complete in the queue before issuing the SCV instruction (420) to the branch resolution unit (314). For example, branch issue queue (312) may read a bit set in the SCV instruction (420) that indicates to the branch issue queue (312) that the SCV instruction (420) must be the next instruction to complete before the SCV instruction (420) may be sent to the branch resolution unit (314).

The method of FIG. 4 also includes issuing (408) the SCV instruction (420) to a branch resolution unit (314). Issuing (408) the SCV instruction (420) to a branch resolution unit (314) may be carried out by waiting until the SCV instruction (420) is next-to-complete (i.e., is the next instruction in the queue to be completed).

The method of FIG. 4 also includes executing (410) the SCV instruction (420) by the branch resolution unit (314). Executing (410) the SCV instruction (420) by the branch resolution unit (314) may be carried out by determining, by the branch resolution unit (314) that the instruction is an SCV instruction (420). Determining, by the branch resolution unit (314) that the instruction is an SCV instruction (420) may include examining, by the branch resolution unit (314) one or more bits in the decoded SCV instruction that indicate to the branch resolution unit (314) that the instruction is an SCV instruction.

For example, the SCV instruction (420) may include elements indicating that the SCV instruction (420) will write to the link register and the counter register. The branch resolution unit (314) may detect the elements and execute the SCV instruction (420) accordingly. This may include executing the SCV instruction (420) as though it were a branch instruction writing to the link register and the counter register. As discussed above, the branch issue queue (312) and the branch resolution unit (314) may handle the SCV instruction (420) as though it were a branch instruction, even though the SCV instruction (420) is not a branch instruction.

Figure 5:
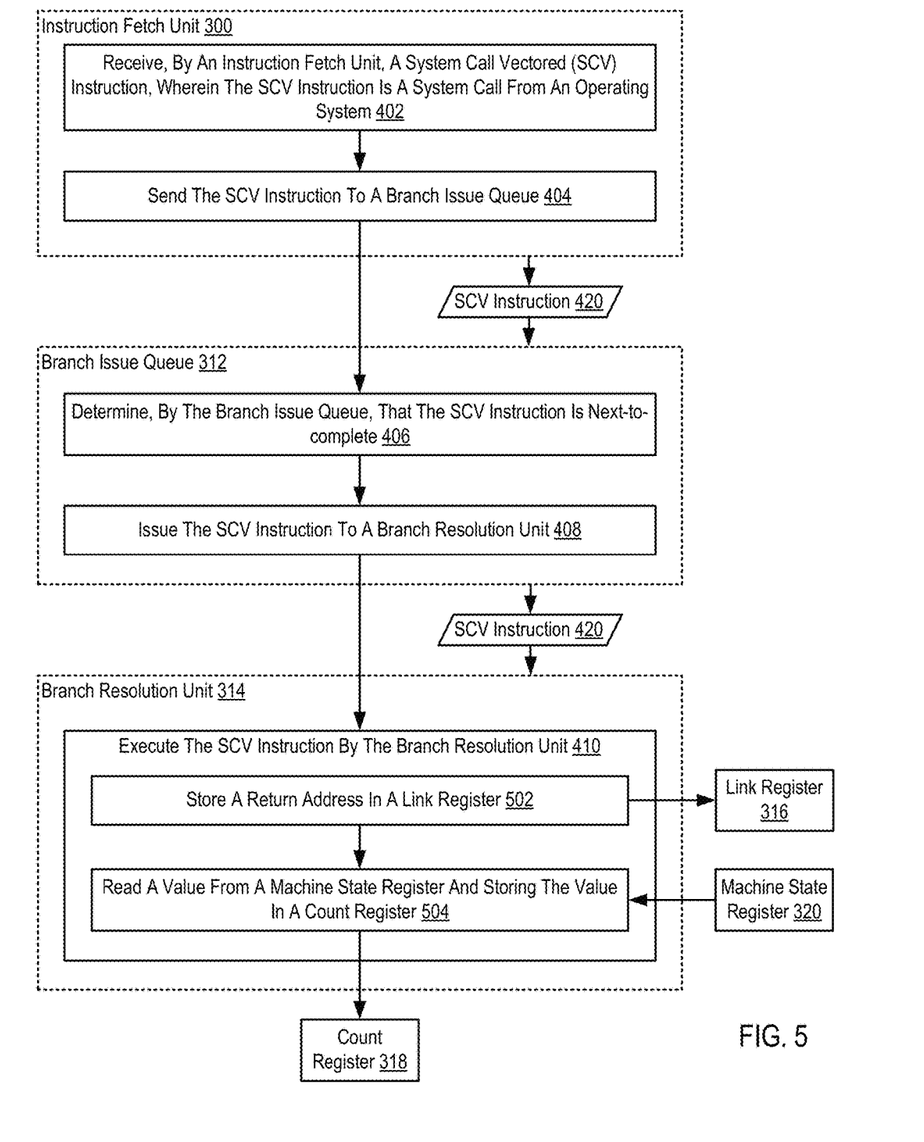
FIG. 5 sets forth a flow chart illustrating an exemplary method for executing SCV instructions in a multi-slice processor according to embodiments of the present invention.

For further explanation, FIG. 5 sets forth a flow chart illustrating an exemplary method for executing SCV instructions in a multi-slice processor according to embodiments of the present invention that includes receiving (402), by an instruction fetch unit (300), a SCV instruction (420), wherein the SCV instruction (420) is a system call from an operating system; sending (404) the SCV instruction (420) to a branch issue queue (312); determining (406), by the branch issue queue (312), that the SCV instruction (420) is next-to-complete; issuing (408) the SCV instruction (420) to a branch resolution unit (314); and executing (410) the SCV instruction (420) by the branch resolution unit (314).

The method of FIG. 5 differs from the method of FIG. 4, however, in that executing (410) the SCV instruction (420) by the branch resolution unit (314) includes storing (502) a return address in a link register (316); and reading (504) a value from a machine state register (320) and storing the value in a count register (316). Storing (502) a return address in a link register (316) may be carried out by incrementing the instruction address (such as an effective address) to point to the next instruction address. For example, the brand resolution unit (314) may increment the effective address stored in the link register (316) to refer to the next consecutive effective address.

Reading (504) a value from a machine state register (320) and storing the value in a count register (316) may be carried out by reading the machine state register (320) from the instruction sequencing unit and storing the value in the count register (318). The branch resolution unit (314) may store the value in the count register (316) without decrementing the value stored in the count register (316). Specifically, the branch resolution unit (314) may replace the value in the count register (316) with the value read from the machine state register (320) instead of decrementing the value in the count register (316), as is typically done by branch instructions.

Figure 6:
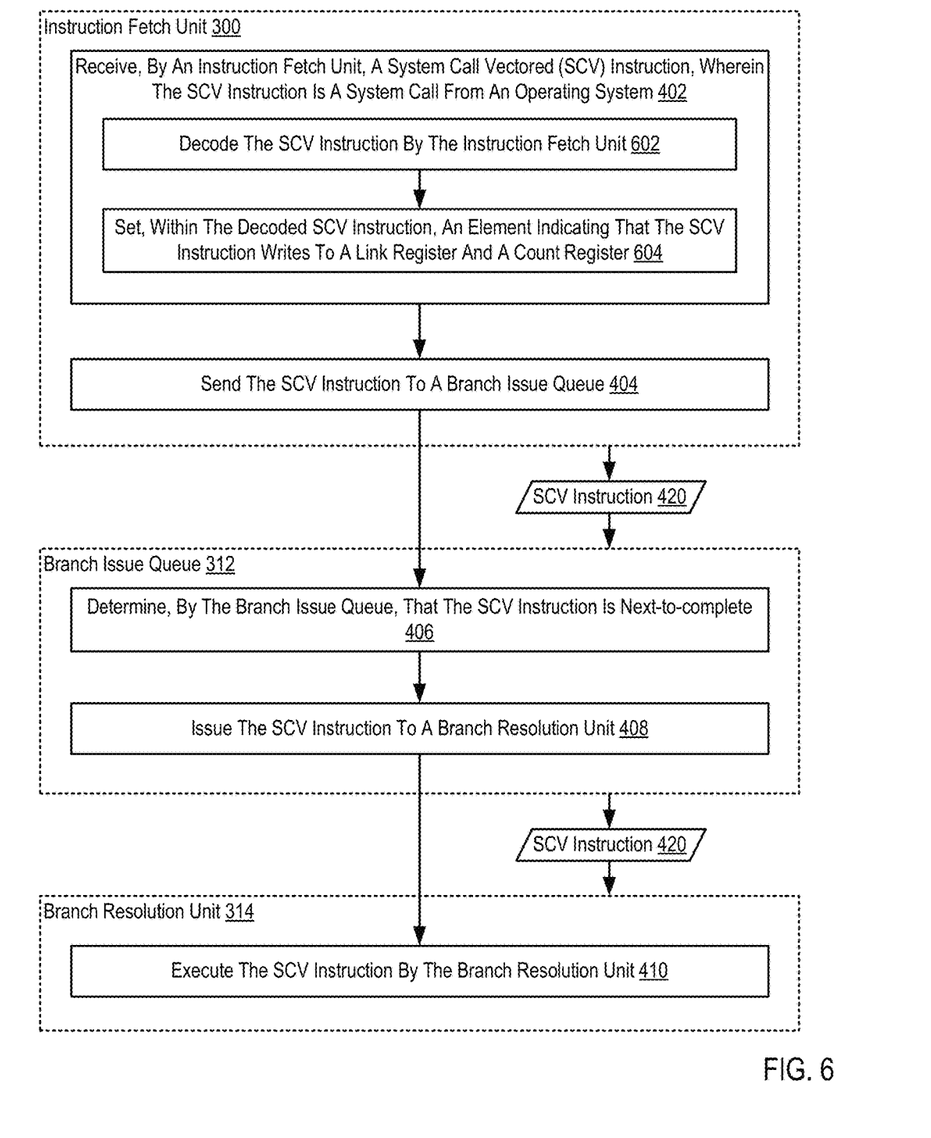
FIG. 6 sets forth a flow chart illustrating an exemplary method for executing SCV instructions in a multi-slice processor according to embodiments of the present invention.

For further explanation, FIG. 6 sets forth a flow chart illustrating an exemplary method for executing SCV instructions in a multi-slice processor according to embodiments of the present invention that includes receiving (402), by an instruction fetch unit (300), a SCV instruction (420), wherein the SCV instruction (420) is a system call from an operating system; sending (404) the SCV instruction (420) to a branch issue queue (312); determining (406), by the branch issue queue (312), that the SCV instruction (420) is next-to-complete; issuing (408) the SCV instruction (420) to a branch resolution unit (314); and executing (410) the SCV instruction (420) by the branch resolution unit (314).

The method of FIG. 6 differs from the method of FIG. 4, however, in that receiving (402), by an instruction fetch unit (300), a SCV instruction (420), wherein the SCV instruction (420) is a system call from an operating system includes decoding (602) the SCV instruction (420) by the instruction fetch unit (300); and setting (604), within the decoded SCV instruction (420), an element indicating that the SCV instruction (420) writes to a link register and a count register.

Decoding (602) the SCV instruction (420) by the instruction fetch unit (300) may be carried out by the instruction decode logic decoding the SCV instruction (420) into a decoded SCV instruction, such as an internal operation. For example, the SCV instruction (420) may be received by the instruction fetch unit (300) as a processor instruction, and the SCV instruction (420) may be decoded into a single internal operation.

Setting (604), within the decoded SCV instruction (420), an element indicating that the SCV instruction (420) writes to a link register and a count register may be carried out by placing a bit in the decoded SCV instruction (420) that signals to the branch issue queue (312) and the branch resolution unit (314) that the SCV instruction (420) intends to write to the link register and the count register. The elements indicating the SCV instruction (420) writes to a link register and a count register may be the same elements set in a branch instruction during the decoding process of a branch instruction.

Figure 7:
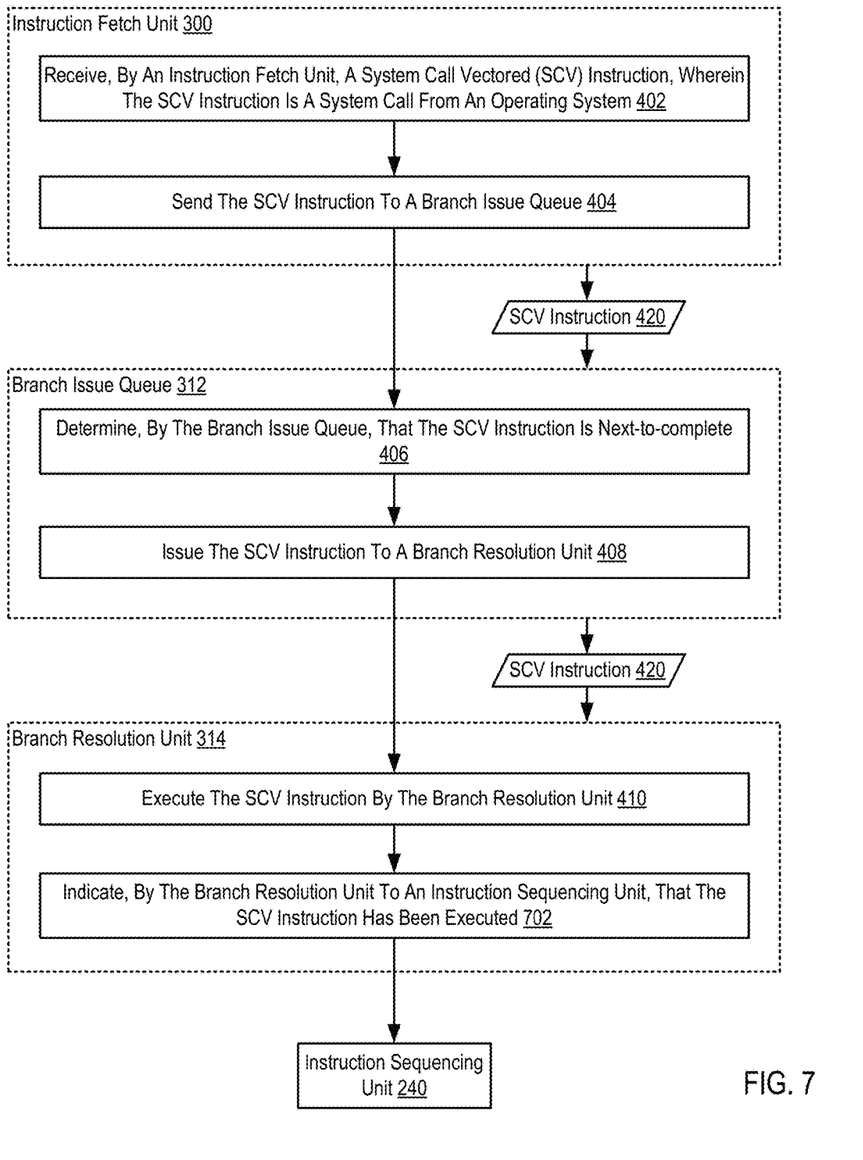
FIG. 7 sets forth a flow chart illustrating an exemplary method for executing SCV instructions in a multi-slice processor according to embodiments of the present invention.

For further explanation, FIG. 7 sets forth a flow chart illustrating an exemplary method for executing SCV instructions in a multi-slice processor according to embodiments of the present invention that includes receiving (402), by an instruction fetch unit (300), a SCV instruction (420), wherein the SCV instruction (420) is a system call from an operating system; sending (404) the SCV instruction (420) to a branch issue queue (312); determining (406), by the branch issue queue (312), that the SCV instruction (420) is next-to-complete; issuing (408) the SCV instruction (420) to a branch resolution unit (314); and executing (410) the SCV instruction (420) by the branch resolution unit (314).

The method of FIG. 7 differs from the method of FIG. 4, however, in that the method of FIG. 7 further includes indicating (702), by the branch resolution unit (314) to an instruction sequencing unit (240), that the SCV instruction (420) has been executed. Indicating (702), by the branch resolution unit (314) to an instruction sequencing unit (240), that the SCV instruction (420) has been executed may be carried out by sending, by the branch resolution unit (314), an exception indication to the instruction sequencing unit (240). In response to receiving the exception indication, the instruction sequencing unit (240) may perform certain tasks consistent with receiving an indication of an exception. Such tasks may include updating the machine state register and flushing one or more other registers.

Figure 8:
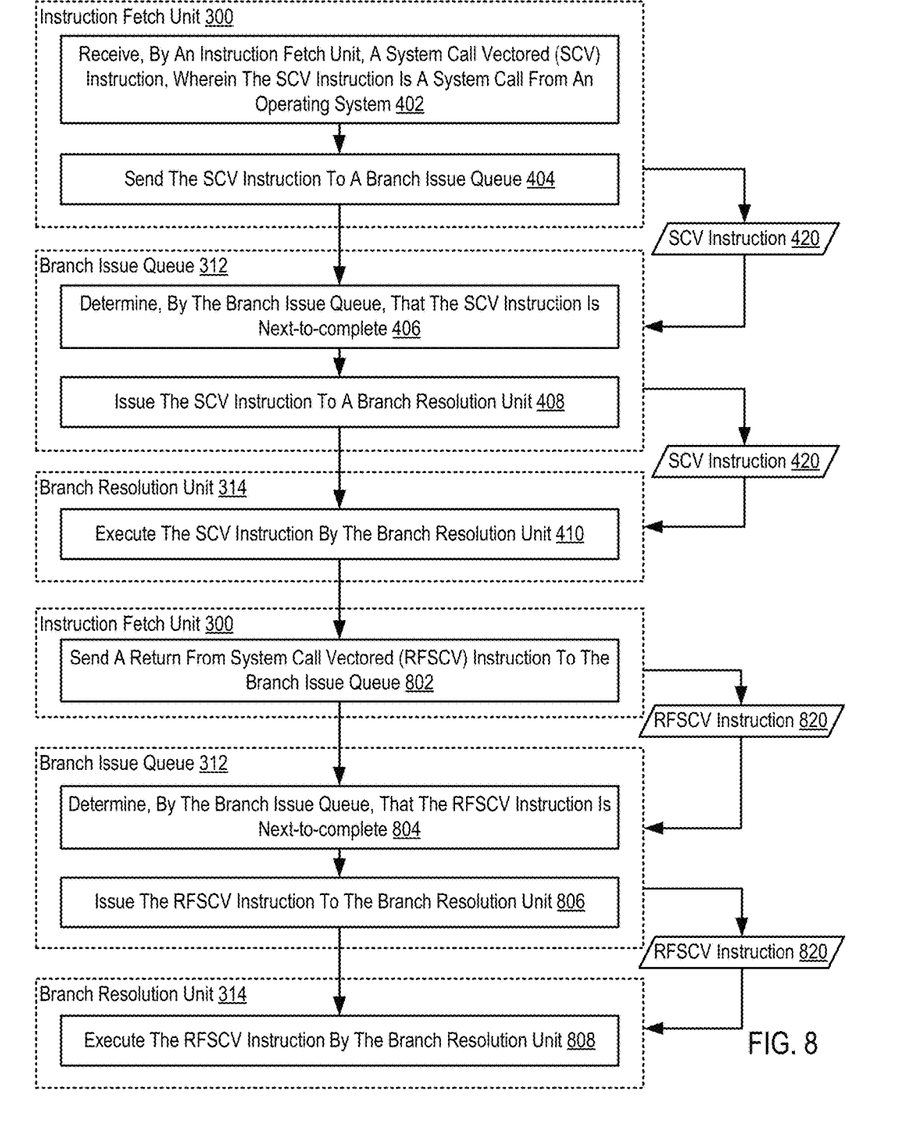
FIG. 8 sets forth a flow chart illustrating an exemplary method for executing SCV instructions in a multi-slice processor according to embodiments of the present invention.

For further explanation, FIG. 8 sets forth a flow chart illustrating an exemplary method for executing SCV instructions in a multi-slice processor according to embodiments of the present invention that includes receiving (402), by an instruction fetch unit (300), a SCV instruction (420), wherein the SCV instruction (420) is a system call from an operating system; sending (404) the SCV instruction (420) to a branch issue queue (312); determining (406), by the branch issue queue (312), that the SCV instruction (420) is next-to-complete; issuing (408) the SCV instruction (420) to a branch resolution unit (314); and executing (410) the SCV instruction (420) by the branch resolution unit (314).

The method of FIG. 8 differs from the method of FIG. 4, however, in that the method of FIG. 8 further includes sending (802) a return from system call vectored (RFSCV) instruction (820) to the branch issue queue (312). Sending (802) a return from system call vectored (RFSCV) instruction (820) to the branch issue queue (312) may be carried out by decoding the RFSCV instruction by the instruction fetch unit; and setting, within the decoded RFSCV instruction, an element indicating that the RFSCV instruction reads from a link register and a count register and writes to a scratch register.

Setting, within the decoded RFSCV instruction, an element indicating that the RFSCV instruction reads from a link register and a count register and writes to a scratch register may include placing a bit in the decoded RFSCV instruction (820) that signals to the branch issue queue (312) and the branch resolution unit (314) that the RFSCV instruction (820) intends to read from the link register and the count register. The elements indicating the RFSCV instruction (820) reads from a link register and a count register may be the same elements set in a branch instruction during the decoding process of a branch instruction.

The method of FIG. 8 also includes determining (804), by the branch issue queue (312), that the RFSCV instruction (820) is next-to-complete. Determining (804), by the branch issue queue (312), that the RFSCV instruction (820) is next-to-complete may be carried out by receiving an indication from the decode logic that the RFSCV instruction (820) is next-to-complete. The RFSCV instruction (820) may include an element that instructs the branch issue queue (312) to wait until the RFSCV instruction (820) is next-to-complete in the queue before issuing the RFSCV instruction (820) to the branch resolution unit (314). For example, branch issue queue (312) may read a bit set in the RFSCV instruction (820) that indicates to the branch issue queue (312) that the RFSCV instruction (820) must be the next instruction to complete before the RFSCV instruction (820) may be sent to the branch resolution unit (314).

The method of FIG. 8 also includes issuing (806) the RFSCV instruction (820) to the branch resolution unit (314). Issuing (806) the RFSCV instruction (820) to the branch resolution unit (314) may be carried out by waiting until the RFSCV instruction (820) is next-to-complete (i.e., is the next instruction in the queue to be completed). The branch issue queue (312) and the branch resolution unit (314) may handle the RFSCV instruction (820) as though it were a branch instruction, even though the RFSCV instruction (820) is not a branch instruction.

The method of FIG. 8 also includes executing (808) the RFSCV instruction (820) by the branch resolution unit (314). Executing (808) the RFSCV instruction (820) by the branch resolution unit (314) may be carried out by determining, by the branch resolution unit (314) that the instruction is an RFSCV instruction (820). Determining, by the branch resolution unit (314) that the instruction is an RFSCV instruction (820) may include examining, by the branch resolution unit (314) one or more bits in the decoded RFSCV instruction that indicate to the branch resolution unit (314) that the instruction is an RFSCV instruction.

Executing (808) the RFSCV instruction (820) by the branch resolution unit (314) may further be carried out by reading the value from a count register and sending the value to the instruction sequencing unit; and reading the return address from a link register and loading the return address into a scratch register.

Reading the value from a count register and sending the value to the instruction sequencing unit may include sending the value read from the count register to the instruction sequencing unit as the machine state register value. The instruction sequencing unit may store the value in the machine state register as the current machine state register value representing the current operating state of the computing system.

Reading the return address from a link register and loading the return address into a scratch register may include reading an effective address stored in the link register and copying the effective address into a scratch register. The scratch register is a temporary storage location in the instruction sequencing unit that may be used to temporarily store data, such as an effective address copied from the link register. Once the RFSCV instruction (820) is executed, the instruction fetch unit (300) begins executing instructions beginning with the instruction stored at the effective address placed in the scratch register.

Exemplary embodiments of the present invention are described largely in the context of a fully functional computer system for executing SCV instructions in a multi-slice processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of executing system call vectored instructions, the method comprising:
   receiving, by an instruction fetch unit, a system call vectored (SCV) instruction, wherein the SCV instruction is a system call from an operating system, including:
      decoding the SCV instruction by the instruction fetch unit; and
      setting, within the decoded SCV instruction, an element indicating that the SCV instruction writes to a link register and a count register;
   sending the SCV instruction to a branch issue queue;
   determining, by the branch issue queue, that the SCV instruction is next-to-complete;
   issuing the SCV instruction to a branch resolution unit; and
   executing the SCV instruction by the branch resolution unit.

2. The method of claim 1, wherein executing the SCV instruction by the branch resolution unit comprises:
   storing a return address in a link register; and
   reading a value from a machine state register and storing the value in a count register.

3. The method of claim 1 further comprising:
   indicating, by the branch resolution unit to an instruction sequencing unit, that the SCV instruction has been executed.

4. The method of claim 1 further comprising:
   sending a return from system call vectored (RFSCV) instruction to the branch issue queue;
   determining, by the branch issue queue, that the RFSCV instruction is next-to-complete;
   issuing the RFSCV instruction to the branch resolution unit; and
   executing the RFSCV instruction by the branch resolution unit.

5. The method of claim 4, wherein executing the RFSCV instruction by the branch resolution unit comprises:
   reading the value from a count register and sending the value to the instruction sequencing unit; and
   reading the return address from a link register and loading the return address into a scratch register.

6. The method of claim 4, wherein sending the RFSCV instruction comprises:
   decoding the RFSCV instruction by the instruction fetch unit; and
   setting, within the decoded RFSCV instruction, an element indicating that the RFSCV instruction reads from a link register and a count register.

7. A multi-slice processor configured to carry out:
   receiving, by an instruction fetch unit, a system call vectored (SCV) instruction, wherein the SCV instruction is a system call from an operating system, including:
      decoding the SCV instruction by the instruction fetch unit; and
      setting, within the decoded SCV instruction, an element indicating that the SCV instruction writes to a link register and a count register;

sending the SCV instruction to a branch issue queue;

determining, by the branch issue queue, that the SCV instruction is next-to-complete;

issuing the SCV instruction to a branch resolution unit; and executing the SCV instruction by the branch resolution unit.

8. The multi-slice processor of claim 7, wherein executing the SCV instruction by the branch resolution unit comprises:

storing a return address in a link register; and reading a value from a machine state register and storing the value in a count register.

9. The multi-slice processor of claim 7, wherein the multi-slice processor is further configured to carry out:

indicating, by the branch resolution unit to an instruction sequencing unit, that the SCV instruction has been executed.

10. The multi-slice processor of claim 7, wherein the multi-slice processor is further configured to carry out:

sending a return from system call vectored (RFSCV) instruction to the branch issue queue;

determining, by the branch issue queue, that the RFSCV instruction is next-to-complete;

issuing the RFSCV instruction to the branch resolution unit; and executing the RFSCV instruction by the branch resolution unit.

11. The multi-slice processor of claim 10, wherein executing the RFSCV instruction by the branch resolution unit comprises:

reading the value from a count register and sending the value to the instruction sequencing unit; and reading the return address from a link register and loading the return address into a scratch register.

12. The multi-slice processor of claim 10, wherein sending the RFSCV instruction comprises:

decoding the RFSCV instruction by the instruction fetch unit; and setting, within the decoded RFSCV instruction, an element indicating that the RFSCV instruction reads from a link register and a count register.

13. An apparatus comprising:

a multi-slice processor configured to carry out:

receiving, by an instruction fetch unit, a system call vectored (SCV) instruction, wherein the SCV instruction is a system call from an operating system, including:

decoding the SCV instruction by the instruction fetch unit; and setting, within the decoded SCV instruction, an element indicating that the SCV instruction writes to a link register and a count register;

sending the SCV instruction to a branch issue queue;

determining, by the branch issue queue, that the SCV instruction is next-to-complete;

issuing the SCV instruction to a branch resolution unit; and executing the SCV instruction by the branch resolution unit.

14. The apparatus of claim 13, wherein executing the SCV instruction by the branch resolution unit comprises:

storing a return address in a link register; and reading a value from a machine state register and storing the value in a count register.

15. The apparatus of claim 13, wherein the multi-slice processor is further configured to carry out:

indicating, by the branch resolution unit to an instruction sequencing unit, that the SCV instruction has been executed.

16. The apparatus of claim 13, wherein the multi-slice processor is further configured to carry out:

sending a return from system call vectored (RFSCV) instruction to the branch issue queue;

determining, by the branch issue queue, that the RFSCV instruction is next-to-complete;

issuing the RFSCV instruction to the branch resolution unit; and executing the RFSCV instruction by the branch resolution unit.

17. The apparatus of claim 16, wherein executing the RFSCV instruction by the branch resolution unit comprises:

reading the value from a count register and sending the value to the instruction sequencing unit; and reading the return address from a link register and loading the return address into a scratch register.

* * * * *